(12) United States Patent
Tonegawa

(10) Patent No.: US 8,180,031 B2
(45) Date of Patent: May 15, 2012

(54) DATA COMMUNICATION APPARATUS AND DATA COMMUNICATION METHOD

(75) Inventor: Nobuyuki Tonegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1157 days.

(21) Appl. No.: 12/014,481

(22) Filed: Jan. 15, 2008

(65) Prior Publication Data

US 2008/0198986 A1 Aug. 21, 2008

(30) Foreign Application Priority Data

Feb. 16, 2007 (JP) ................................. 2007-036806

(51) Int. Cl.
*H04M 11/00* (2006.01)

(52) U.S. Cl. ......... 379/100.17; 379/100.14; 379/100.16; 379/90.01

(58) Field of Classification Search ............. 379/100.17, 379/100.14–100.16, 100.01–100.02, 90.01, 379/93.05, 93.04, 93.07, 93.08; 358/1.15, 358/1.13

See application file for complete search history.

(56) References Cited

U.S. PATENT DOCUMENTS

2004/0146050 A1* 7/2004 Burrell et al. ................. 370/352

FOREIGN PATENT DOCUMENTS

| JP | 2005-184351 A | 7/2005 |
| JP | 2005-269165 A | 9/2005 |
| JP | 2005-311670 A | 11/2005 |

* cited by examiner

*Primary Examiner* — Melur Ramakrishnaiah

(74) *Attorney, Agent, or Firm* — Canon U.S.A., Inc. IP Division

(57) ABSTRACT

When data communication is performed by using a call control protocol, a data communication apparatus receives a call connection request message from an external apparatus and transmits a response message in reply to the call connection request message. At that time, when the call connection request message is received, it is determined whether a call connection process for communication with another external apparatus differing from the external apparatus is under execution. Transmission of the response message is controlled based on a result of the determination.

9 Claims, 10 Drawing Sheets

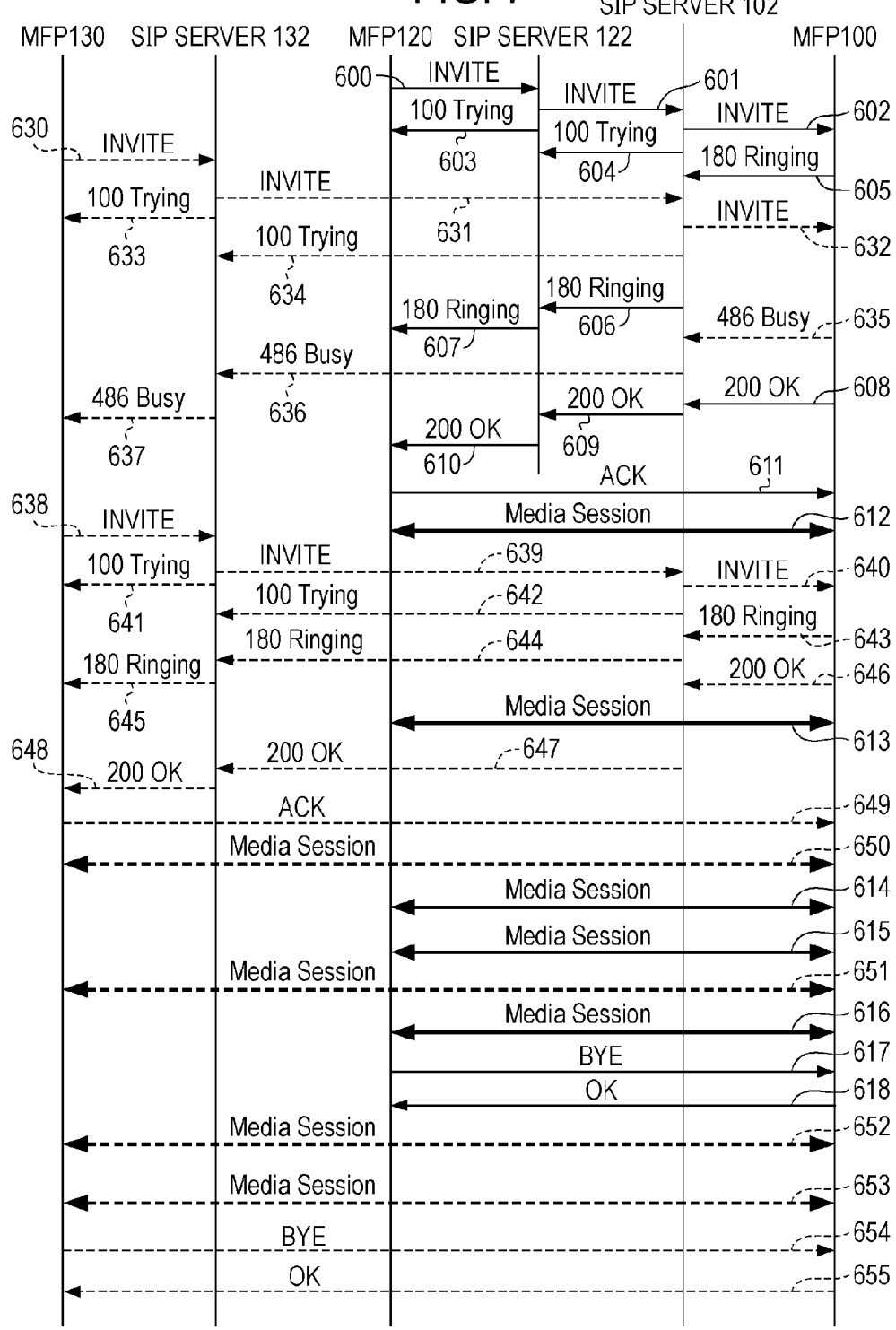

| | |
|---|---|
| 950 | INVITE sip: bob@biloxi. com SIP/2.0 |
| 951 | Via: SIP/2.0/UDP pc33. atlanta. com; branch = z9hG4bK776asdhds |
| 952 | Max-Forward: 70 |
| 953 | To: Bob <sip: bob@biloxi. com> |
| 954 | From: Alice <sip: alice@atlanta. com> ; tag = 1928301774 |
| 955 | Call-ID: a84b4c76e66710@pc33. atlanta. com |
| 956 | CSeq: 314159 INVITE |
| 957 | Contact: <sip: alice@pc33. atlanta. com> |
| 958 | Content-Type: application/sdp |
| 959 | Content-Length: 142 |

DATA COMMUNICATION APPARATUS AND DATA COMMUNICATION METHOD

BACKGROUND OF THE INVENTION

1. Field of the Invention

The present invention relates to a data communication apparatus and a data communication method which are suitable to communicate image data by using a call connection protocol.

2. Description of the Related Art

Recently, IP telephones using a call connection protocol, such as H.323 or SIP, have become prevalent and IP facsimiles in accordance with, e.g., T.38 of the ITU-T recommendations, have also been put into the market.

FIG. 9 illustrates one example of an IP telephone connection process using SIP.

An INVITE request 900 is sent from a transmitter to a transmitter-side SIP server. Responsively, the transmitter-side SIP server sends an INVITE request 902 to a receiver-side SIP server and also replies, to the transmitter, a "Trying" signal message 901 indicating that the transmitter-side SIP server has received the message and is now under trying. Upon receiving the INVITE request 902, the receiver-side SIP server sends an INVITE request 904 to a receiver and also replies a "Trying" signal message 903 to the transmitter-side SIP server.

Upon receiving the INVITE request 904, the receiver starts a ringing tone and sends, to the receiver-side SIP server, a "Ringing" signal message 905 indicating that the receiver is now under ringing. The "Ringing" signal message 905 is transferred to the transmitter through "Ringing" signal messages 906 and 907.

When a user on the receiver side answers the phone, an OK signal message 908 is sent from the receiver to the receiver-side SIP server and is further transferred to the transmitter through OK signal messages 909 and 910. The transmitter having received the OK signal message 910 sends an ACK signal message 911 directly to the receiver. The sequence of call control protocol is then brought to an end.

After the end of the call control sequence, the processing is transited to a media session (Media Session) in which data 912-915 obtained by coding voice data based on, e.g., PCM, are communicated. When a handset is put back after the end of a talk, a BYE signal 916 is sent from the transmitter to the receiver and an OK signal 917 is replied, as a response signal to the BYE signal 916, from the receiver to the transmitter. All steps of the communication are thereby brought to an end.

FIG. 10 illustrates, by way of example, details of the INVITE request 900 shown in FIG. 9.

In a field 950, it is described that the message is the INVITE request. A "Via" header field 951 indicates a transport used for a transaction. A "Max-Forwards" field 952 is a field for limiting the number of hops which are allowed to pass until reaching the receiver.

A field 953 indicates that a receiving person is Bob, and a field 954 indicates that a sending person is Alice. A "Call-ID" header field 955 indicates an identifier for grouping continuous messages. The same Call-Id is used for all of the requests and the corresponding responses.

A "CSeq" header field 956 indicates the number used for identifying and numbering the transactions in order. A "Contact" header field 957 provides SIP URI that can be used to make a contact. A "Content-Type" header field 958 indicates the media type of the message, and a "Content-Length" header field 959 indicates the size of the sent message.

A G3 facsimile in accordance with T.30 is required to have a plurality of telephone lines in order to receive data from a plurality of senders at the same time, while an IP facsimile can make a plurality of connections at the same time because it utilizes one network line in a broad band.

In this respect, Japanese Patent Laid-Open No. 2005-184351 proposes a method of managing the number of call connections under the connected state. The method according to Japanese Patent Laid-Open No. 2005-184351 includes, in a VoIP gateway apparatus, the steps of managing the number of call connections simultaneously under the connected state at that time for at least one assigned telephone number, selecting a telephone number for which the number of call connections simultaneously under the connected state at that time is smaller than the preset allowable number, and executing call control of the selected telephone number.

However, because the SIP protocol does not maintain a network connection between a client and a server which are connected to each other, it is required to process, in addition to commands from a partner who has first requested a connection, commands from another partner in parallel who has then requested a connection. In other words, the SIP protocol operates such that the connection is cut when communication of each message with one partner is ended, and a message communicated with another partner is mixed between one command and the next command. Accordingly, when call connections to a plurality of partners are processed in parallel, status management has to be executed per Call-ID of each JOB in the connected state.

A program for executing such status management operates so as to monitor the status of the receiver to thereby recognize the status of the receiver and commands receivable in the current status, and to reply a predetermined error code when a command other than the receivable commands is received. When one of the receivable commands is received, a complicated process is performed which includes, e.g., steps of executing an internal program corresponding to each command and shifting the status of the receiver from one to another. By executing such a program, resources required to execute the program are occupied.

In some cases, therefore, when call connections to a plurality of partners are processed in parallel, the resources are occupied by the call connection to the partner who has first requested the connection, and sufficient resources are not ensured for communication with the partner who has then requested the connection. Also, because the number of connected JOBs cannot be restricted on the receiver side, there is a possibility that a very large number of JOBs have to be simultaneously processed in parallel. Coping with that case increases the program size, the capacity of a memory used, and the program development cost, thus resulting in a difficulty in performing the operation with an inexpensive system.

SUMMARY OF THE INVENTION

With the view of overcoming the above-described problems, embodiments of the present invention address a data communication apparatus performing data communication by using a call control protocol. More specifically, embodiments of the present invention are directed to a data communication apparatus and a data communication method, which can inexpensively execute communication of image data with a plurality of partners.

According to a first aspect of the present invention, in a data communication apparatus configured to perform data communication by using a call control protocol, the apparatus includes a message receiving unit configured to receive a call connection request message from an external apparatus, a message transmitting unit configured to transmit a response message in reply to the call connection request message, a determining unit configured to determine whether a call connection process for communication with another external apparatus differing from the external apparatus is under execution, when the message receiving unit receives the call connection request message, and a control unit configured to control transmission of the response message from the message transmitting unit based on a determination result of the determining unit.

According to a second aspect of the present invention, in a data communication method configured to perform data communication by using a call control protocol, the method includes receiving a call connection request message from an external apparatus, transmitting a response message in reply to the call connection request message, determining whether a call connection process for communication with another external apparatus differing from the external apparatus is under execution, when the call connection request message is received, and controlling transmission of the response message based on a result of the determination.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principle of the invention.

FIG. 7 illustrates a SIP call connection sequence in Operation Example 3 of the exemplary embodiment.

DESCRIPTION OF THE EMBODIMENTS

An exemplary embodiment of the present invention will be described in detail below with reference to the drawings.

<Exemplary Configuration of Image Communication Network in Exemplary Embodiment>

Figure 1:
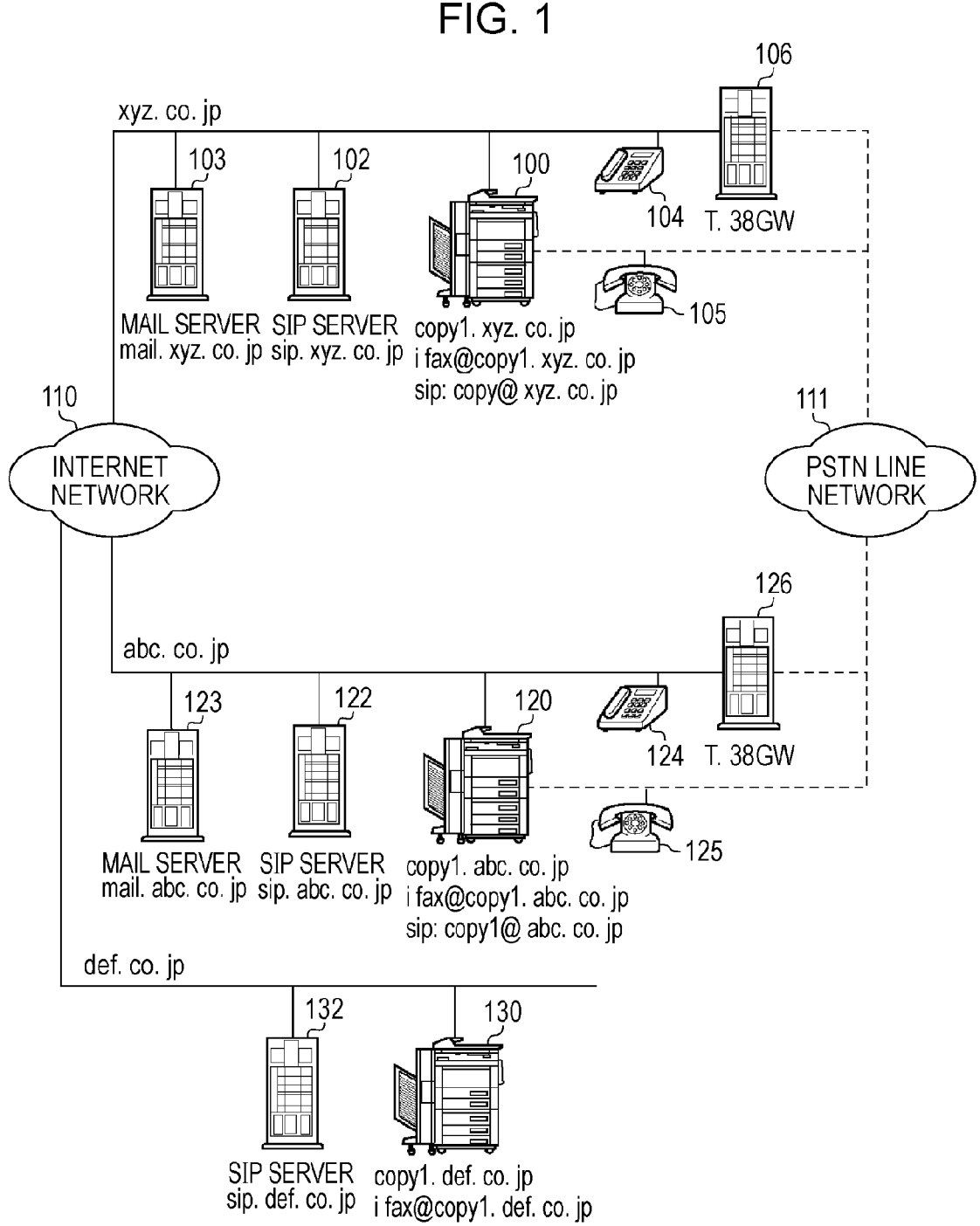
FIG. 1 is a block diagram showing an exemplary configuration of network connections in an exemplary embodiment of the present invention.

FIG. 1 is a block diagram showing an exemplary configuration of network connections in an image communication network according to the exemplary embodiment.

MFPs (Multi-Function Peripherals) 100, 120 and 130 are multi-function copying machines. Each MFP includes a scanner and a printer to provide, e.g., the copy function, the FAX sending/receiving function, the printer function of printing data prepared on a computer (PC).

The MFP 100 is assigned with a HOST name of "copy1.xyz.co.jp", a device electronic mail (Email) address of "ifax@copy1.xyz.co.jp", and a SIP URI of "copy1@xyz.co.jp". The MFP 100 has an Email sending mode of sending an image received with the FAX or IFAX receiving function and a monochrome/color image read by the scanner to an Email destination set on the PC. The MFP 100 also has an IFAX sending mode of sending data to a device in conformity with the T.37 standard of the ITU-T recommendations. Further, the MFP 100 has an IFAX real-time sending mode of sending data to a device in conformity with the T.38 standard of the ITU-T recommendations.

In the Email sending mode, when a color image is read by the scanner, the image is sent as a JPEG or PDF (Portable Document Format) file. When a monochrome image is read, the image can be sent as a TIFF or PDF file. In the IFAX sending mode, image data is converted to a TIFF image in accordance with RFC2301 and is sent as an attachment to an Email. In the IFAX real-time sending mode, image data is converted to an image data packet defined in T.38 and is sent. The image data sent in the IFAX sending mode and the IFAX real-time sending mode is received by a receiver and is printed by the printer.

The MFP 100 is connected to a network having the domain name of "xyz.co.jp". Further, the MFP 100 is connected to a plurality of computers and network equipment including a SIP server 102, a mail server 103, an IP telephone 104, T.38GW 106, etc. The network "xyz.co.jp" is connected to an Internet network 110 covering all over the world.

The MFP 120 is connected to a network having the domain name of "abc.co.jp". Further, the MFP 120 is connected to a plurality of computers and network equipment including a SIP server 122, a mail server 123, an IP telephone 124, T.38GW 126, etc. The network "abc.co.jp" is also connected to the Internet network 110. The MFP 130 is connected to a network having the domain name of "def.co.jp" for connection to a SIP server 132 and further to the Internet network 110.

The T.38GW 106 and 126 are each a gateway apparatus for converting a telephone signal from a PSTN telephone line to a signal on an IP network, or conversely converting a signal on the IP network to a signal on the PSTN telephone line in accordance with the T.38 standard of the ITU-T recommendations. The telephones 105 and 125 are connected to a PSTN line network 111 which is managed by a telephone company such that users can talk with each other under management of respective assigned telephone numbers. The MFPs 100 and 120 have the G3 FAX function and can provide FAX communication when they are connected to the PSTN telephone line.

The SIP servers 102 and 122 are each a SIP server on which the server function of SIP (Session Initiation Protocol) operates. The SIP is specified in the formal document RFC3261 issued by IETF (Internet Research Task Force). The mail servers 103 and 123 are each a mail server for delivering an image-attached Email sent from the MFP and an Email sent from the PC in accordance with SMTP (Simple Mail Transfer Protocol).

When a call is made from the IP telephone 104 to the IP telephone 124, an INVITE request is sent from the IP telephone 104 to the SIP server 102 in accordance with the SIP protocol. The INVITE request is further sent to the IP telephone 124 via the SIP server 122 to perform communication to establish a call connection. After the call connection is established, voice data is communicated in a media session between the IP telephone 104 and the IP telephone 124.

When a call is made from the IP telephone 104 to the telephone 125, an INVITE request is sent from the IP telephone 104 to the SIP server 102 in accordance with the SIP protocol. In response to the INVITE request, a call connection is established with respect to a not-shown SIP server in a telephone company. After the call connection is established, a voice packet originating from the IP telephone 104 as a digital signal is sent to the T.38GW 106 for conversion to an analog signal by the T.38GW 106. The converted analog signal is sent to the telephone 125. On the other hand, an analog signal from the telephone 125 is converted to a digital signal by the T.38GW 106 and is sent to the IP telephone 104.

Communication among the MFPs 100, 120 and 130 will be described in detail later with reference to FIG. 4 and the subsequent drawings.

<Exemplary Configuration of MFP in Exemplary Embodiment>

Figure 2:
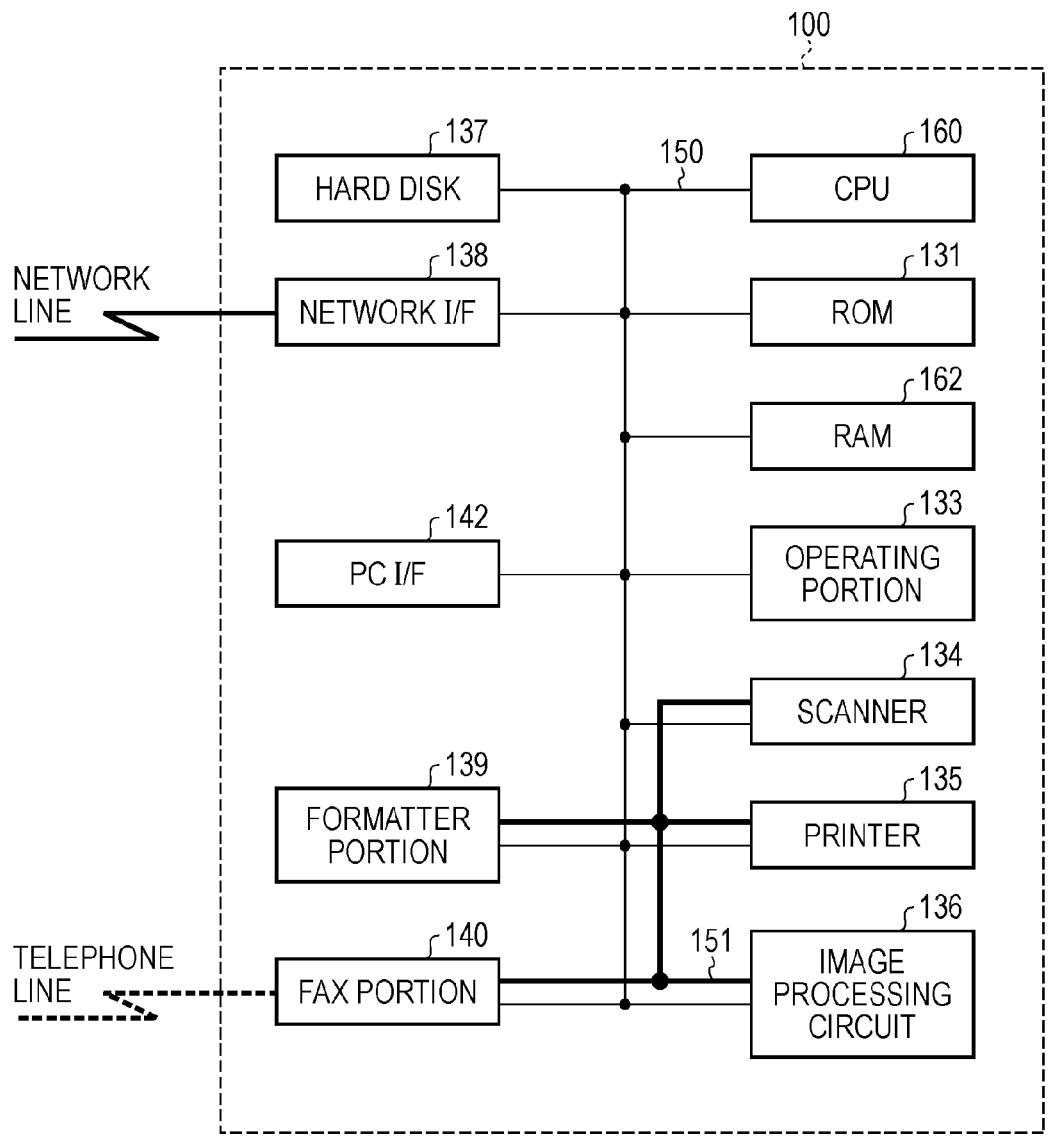
FIG. 2 is a block diagram showing an exemplary system configuration of a multi-function copying machine (peripheral) (MFP).

FIG. 2 is a block diagram showing an exemplary configuration of the MFP 100. A CPU 160 is a control unit configured to perform overall control of a system by utilizing computer programs stored in a ROM 131 and a memory area of a RAM 162.

An operating portion 133 includes an LCD display panel and hard keys, such as a start key and numerical keys. More specifically, the operating portion 133 displays buttons on the LCD in a software way and detects touching of the user's finger on the buttons so that user's input operations are smoothly performed.

A scanner 134 converts image data of an original to electric data through photoelectric conversion. When the original is conveyed from an original feeder onto a platen glass, a lamp is turned on and a scanner unit is stated to move for exposure of the original with scanning. Light reflected from the original is introduced to a CCD image sensor by a mirror and a lens for conversion to an electric signal. The electric signal is further converted to digital data by an A/D conversion circuit. After the operation of reading the original, the original on the platen glass is ejected out from the scanner.

A printer 135 prints electric image data on a recording sheet. A laser beam corresponding to the electric image data is emitted from a laser source unit, and the emitted laser beam is irradiated to a photosensitive drum such that a latent image corresponding to the laser beam is formed on the photosensitive drum. A toner supplied from a developer is attached to an area of the latent image on the photosensitive drum. The recording sheet is fed from a paper feed cassette and is conveyed to a transfer region at the timing in sync with the start of irradiation of the laser beam. In the transfer region, the toner attached to the photosensitive drum is transferred to the recording sheet. The recording sheet including the toner having been transferred thereto is conveyed to a fuser. The toner is fused and fixed to the recording sheet by the action of heat and pressure generated by the fuser. After having passed through the fuser, the recording sheet is ejected out from the printer by an eject roller. A sorter selectively puts the ejected recording sheet into proper one of bins for sorting.

An image processing circuit 136 includes, for example, a large-capacity image memory, an image rotation circuit, a resolution changing circuit, and a coding/decoding circuit adapted for MH, MR, MMR, JBIG, JPEG, etc. The image processing circuit 136 can also execute various kinds of image processing such as shading, trimming, and masking.

A hard disk 137 is a large-capacity recording medium connected through an I/F, e.g., SCSI or IDE.

A network I/F 138 serves as a network data link for connection to a network line, such as Ethernet® represented by 10BASE-T and 100BASE-T or Token Ring. A PC I/F 142 serves as an interface with the computer (PC) and is constituted by a parallel interface in conformity with IEEE1284 or a serial interface using, e.g., USB.

A formatter portion 139 is a rendering circuit configured to prepare image data from PDL (Page Description Language) data received via the PC I/F 142 or the network I/F 138. The prepared image data is subjected to image processing in the image processing circuit 136 and is printed by the printer 135.

A fax portion 140 is a fax I/F circuit which is connected to the telephone lien and comprises, e.g., an NCU (Network Control Unit) or a MODEM (Modulator/DEModulator). Image data read by the scanner 134 is subjected to image processing in the image processing circuit 136 and is sent to another FAX via the telephone line. On the other hand, data sent from another FAX is received by the fax portion 140, is subjected to image processing in the image processing circuit 136, and is printed by the printer 135.

The scanner 134, the printer 135, the image processing circuit 136, the formatter portion 139, and the fax portion 140 are interconnected by a high-speed video bus 151, which differs from a CPU bus 150 extending from the CPU 160, so that image data can be transferred at a high speed.

In the MFP 100, the copy function is realized by subjecting the image data read by the scanner 134 to the image processing in the image processing circuit 136 and operating the printer 135 so as to print the image data read by the scanner 134.

Further, the MFP 100 has a "Send" function of subjecting the image data read by the scanner 134 to the image processing in the image processing circuit 136 and sending the processed image data to the network via the network I/F 138. In addition, the MFP 100 has an IFAX function of preparing an image in accordance with RFC2301 in the image processing circuit 136 and sending/receiving data by employing an Email protocol.

<Exemplary Storage Configuration in Exemplary Embodiment>

Figure 3A:
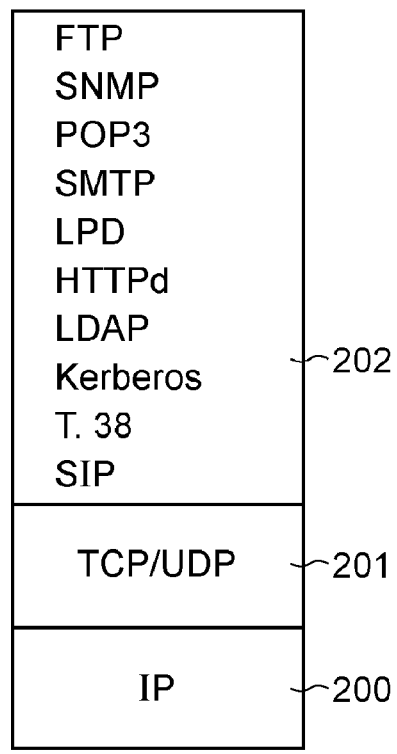
FIG. 3A illustrates an exemplary configuration of programs stored in a ROM of the MFP.

FIG. 3A illustrates an exemplary configuration of network programs stored in the MFP 100. The network programs can be stored in the ROM 131 or can be stored in the hard disk 137 and loaded into the RAM 162 for execution by the CPU 160.

A network program configuration is mainly divided into three layers, i.e., an IP (Internet Protocol) layer 200, a TCP (Transmission Control Protocol)/UDP (User Datagram Protocol) layer 201, and an application layer 202 including various programs.

The IP layer 200 is an Internet protocol layer that provides service for sending a message from an originator host to a destination host in cooperation with a relay node, e.g., a router. The IP layer 200 executes a routing function of managing the address of the originator sending data and the address of the destination receiving the data, and managing based on address information what rout within the network is used to deliver the data to the destination host.

The TCP/UDP layer 201 is a transport layer that provides service for delivering a message from a sending application process to a receiving application process. The TCP provides connection-type service while ensuring high communication reliability, and the UDP provides connectionless-type service while not ensuring communication reliability.

The application layer 202 including various programs specifies a plurality of protocols which contain FTP (File Transfer Protocol) that provides file transfer service; SNMP that is a network management protocol; LPD that is a server protocol to manage printing by the printer; HTTPd that is a protocol for a WWW (Word Wide Web) server; SMTP (Simple Mail Transfer Protocol) that is an Email sending/receiving protocol; POP3 (Post Office Protocol—Version 3) that is a mail download protocol; and LDAP (Lightweight Directory Access Protocol) that is a protocol for accessing a directory database managing user's Email addresses, etc.

Also, the application layer 202 includes a Kerberos authentication program that is specified in RFC1510. The application layer 202 further includes T.38 that provides the IFAX real-time mode in the ITU-T recommendations, and SIP (Session Initiation Protocol) specified in RFC3261.

Figure 3B:
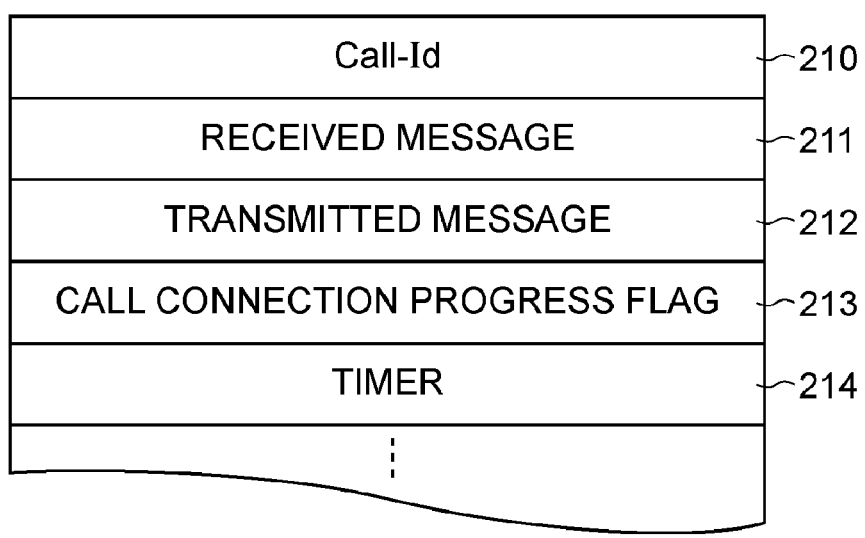
FIG. 3B illustrates an exemplary configuration of data stored in a RAM of the MFP.

FIG. 3B illustrates an exemplary configuration of storage areas allocated in the RAM 162 to implement the exemplary embodiment. Note that FIG. 3B illustrates only information necessary for the following description and the other information is omitted.

Numeral 210 represents an area storing Call-Id that is specific to each MFP and is used to identify transactions of messages with other MFPs. Numeral 211 represents an area storing messages received from other MFPs, such as the INVITE request and the ACK signal. Numeral 212 represents an area storing messages sent to other MFPs, such as the OK signal. Numeral 213 represents an area storing a call connection progress flag indicating that a call connection process is ongoing with respect to another MFP. Numeral 214 represents a timer area storing a time lapsed from the reception of a message to monitor a timeout (200 msec in the exemplary embodiment) for making a response.

<Operation Examples on Image Communication Network According to Exemplary Embodiment>

Operation examples on the image communication network according to the exemplary embodiment will be described below with reference to the drawings.

OPERATION EXAMPLE 1

Network

Figure 4:
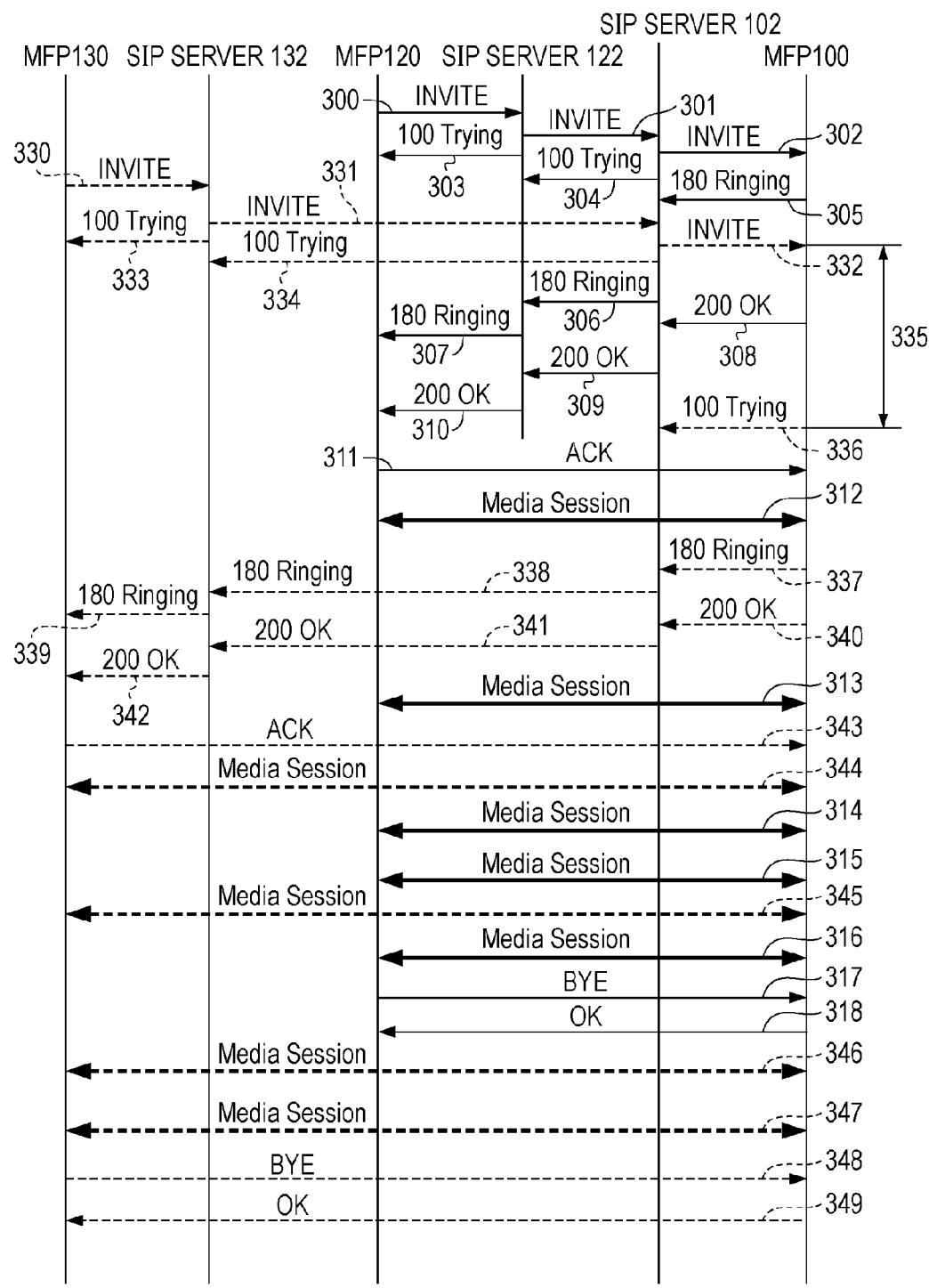
FIG. 4 illustrates a SIP call connection sequence in Operation Example 1 of the exemplary embodiment.

FIG. 4 illustrates an operation example of the exemplary embodiment when T.38 communication between the MFP 100 and the MFP 120 and T.38 communication between the MFP 100 and the MFP 130 are executed in parallel.

Initially, T.38 communication is executed from the MFP 120 to the MFP 100. At that time, an INVITE request 300, i.e., a call control request message, is sent from the MFP 120 to the SIP server 122 in accordance with the SIP protocol. In the following description, the expression "INVITE request" is used. Upon receiving the INVITE request 300, the SIP server 122 replies, as a response, a "Trying" signal 303 to the MFP 120 and sends an INVITE request 301 to the SIP server 102. Upon receiving the INVITE request 301, the SIP server 102 replies, as a response, a "Trying" signal 304 to the SIP server 122 and sends an INVITE request 302 to the MFP 100 (hereinafter a "Trying" message is also called a "Trying signal").

Upon receiving the INVITE request 302, the MFP 100 shifts the apparatus status to a ringing state and starts a ringing tone. Further, the MFP 100 replies, as a response to the INVITE request 302, a "Ringing" signal 305 to the SIP server 102. Hereinafter, a "Ringing" message is also called a "Ringing signal".

When T.38 communication is executed from the MFP 130 to the MFP 100 in a state during the execution of the above call control communication, an INVITE request 330 is sent from the MFP 130 to the SIP server 132 in accordance with the SIP protocol. Upon receiving the INVITE request 330, the SIP server 132 replies, as a response, a "Trying" signal 333 to the MFP 130 and sends an INVITE request 331 to the SIP server 102. Upon receiving the INVITE request 331, the SIP server 102 replies, as a response, a "Trying" signal 334 to the SIP server 132 and sends an INVITE request 332 to the MFP 100.

In this example, because the MFP 100 has already executed the SIP session (call connection process) with respect to the MFP 120, the MFP 100 does not response to the request from the MFP 130. In other words, communication control is executed such that the MFP 100 does not immediately replies a "Ringing" signal which should be replied to the MFP 130, and it replies the "Ringing" signal after the end of the SIP session with respect to the MFP 120.

On the other hand, upon receiving the "Ringing" signal 305 from the MFP 100 in response to the INVITE request 302, the SIP server 102 replies, to the SIP server 122, a "Ringing" signal 306 indicating that the MFP 100 has come into a ringing state. Upon receiving the "Ringing" signal 306, the SIP server 122 replies a "Ringing" signal 307 to the MFP 120, thus notifying the MFP 120 of the situation that the MFP 100 is now in the ringing state.

When the MFP 100 comes into a state capable of receiving image data from the MFP 120, the MFP 100 replies an OK signal 308 to the SIP server 102. Upon receiving the OK signal 308, the SIP server 102 replies an OK signal 309 to the SIP server 122. Then, when the SIP server 122 replies an OK signal 310 to the MFP 120, the MFP 120 can confirm that the MFP 100 has come into the data receivable state. Hereinafter, an OK message is also called an OK signal.

By confirming that the MFP 100 has come into the data receivable state, the MFP 120 directly sends an ACK signal 311 to the MFP 100, thus notifying that data is going to be sent from now. Hereinafter, an ACK message or command is also called an ACK signal.

Although the MFP 100 also receives the INVITE request 332 from the MFP 130 other than the communication from the MFP 120, the MFP 100 does not respond to the INVITE request 332 because the SIP session with respect to the MFP 120 is not yet ended. RFC3261 specifies that, if a time of 200 msec or longer is required to make a final response, a provisional response has to be replied. Therefore, when a time of 180 msec (denoted by 335) has lapsed after the reception of the INVITE request 332 and the SIP session with respect to the MFP 120 is not yet ended, the MFP 100 replies a "Trying" signal 336 as a provisional response code to the SIP server 102. The value of 180 msec is preset in consideration of a margin of 20 msec to ensue that the specified value of 200 msec is not exceeded.

Thereafter, the SIP session with respect to the MFP 120 is ended by communication of the ACK signal 311 and the processing is transited to Media Sessions 312-316 (media session communication) in which the image data is sent from the MFP 120 to the MFP 100. At the time when the complicated communication process, i.e., the SIP session, from the MFP 120 is ended and the processing is transited to the simple media sessions, the SIP session with respect to the MFP 130, which has been temporarily interrupted, is resumed.

In response to the INVITE request 332 from the MFP 130, the MFP 100 shifts the apparatus status to a ringing state and starts a ringing tone. Further, the MFP 100 replies, as a formal response to the INVITE request 332, a "Ringing" signal 337 to the SIP server 102. Upon receiving the "Ringing" signal 337, the SIP server 102 replies a "Ringing" signal 338 to the SIP server 132, and the SIP server 132 sends a "Ringing" signal 339 to the MFP 130. Thus, the MFP 130 can confirm that the MFP 100 has come into a ringing state.

When the MFP 100 comes into a state capable of receiving image data from the MFP 130, the MFP 100 replies an OK signal 340 to the SIP server 102. Upon receiving the OK signal 340, the SIP server 102 replies an OK signal 341 to the SIP server 132. Then, when the SIP server 132 replies an OK signal 342 to the MFP 130, the MFP 130 can confirm that the MFP 100 has come into the data receivable state.

By confirming that the MFP 100 has come into the data receivable state, the MFP 130 directly sends an ACK signal 343 to the MFP 100, thus notifying that data is going to be sent from now. Numerals 344-347 represent Media Sessions between the MFP 130 and the MFP 100 in which the image data is sent from the MFP 130 to the MFP 100. During a time zone from 344 to 316, the media sessions from the MFP 120 to the MFP 100 are overlapped with the media sessions from the MFP 130 to the MFP 100. In other words, the MFP 100 processes the image data sent from two other MFPs in parallel.

When the transmission of the image data to be sent from the MFP 120 is ended, the MFP 120 sends a BYE signal 317 to the MFP 100. Then, the MFP 100 replies an OK signal 318 to the MFP 120, whereby a series of communication steps from the MFP 120 to the MFP 100 are completed. (Hereinafter, a BYE message or command is also called a BYE signal.) Further, when the transmission of the image data to be sent from the MFP 130 is ended, the MFP 130 sends a BYE signal 348 to the MFP 100. Then, the MFP 100 replies an OK signal 349 to the MFP 130, whereby a series of communication steps from the MFP 130 to the MFP 100 are completed.

OPERATION EXAMPLE 2

Network

Figure 5:
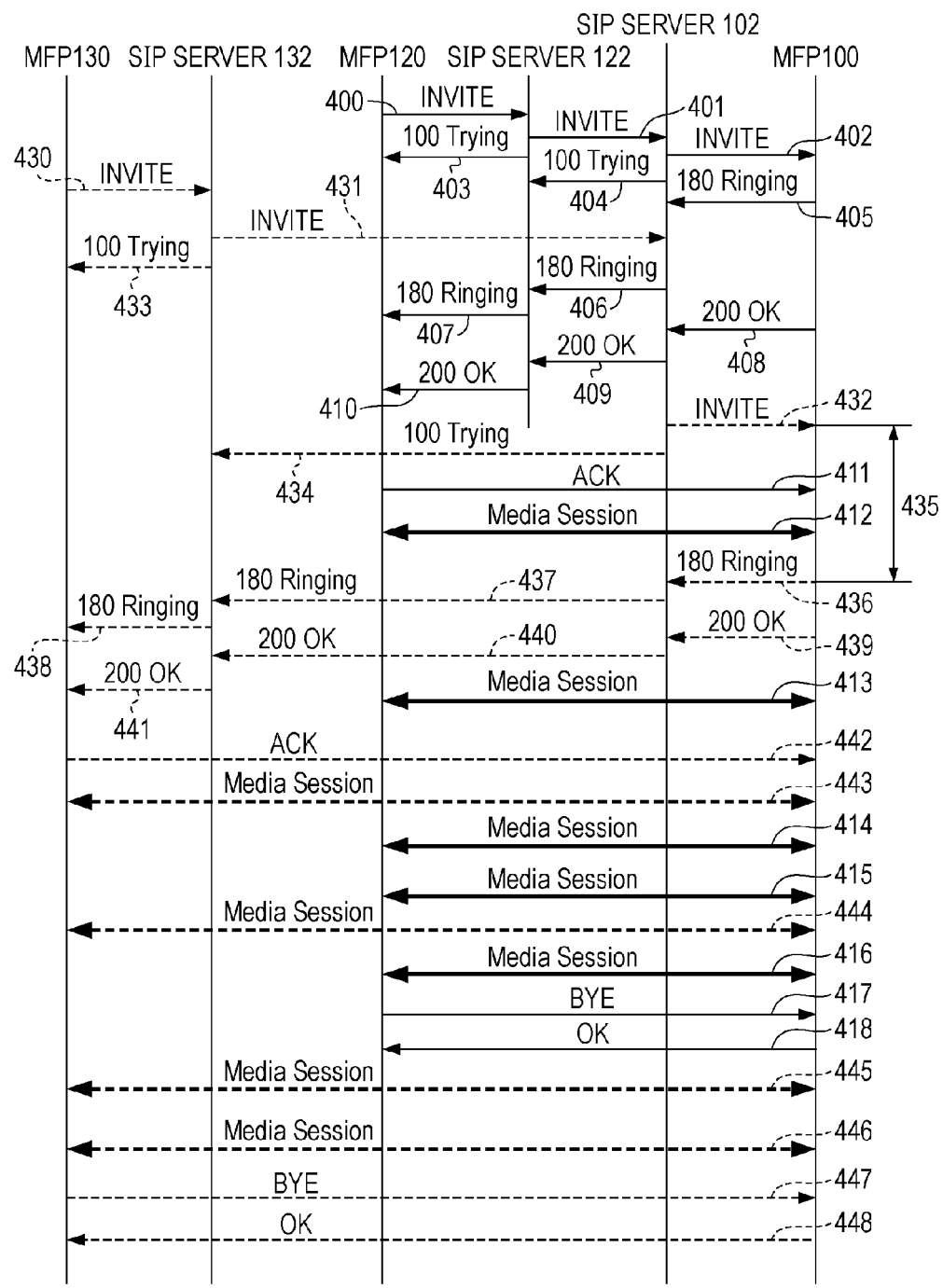
FIG. 5 illustrates a SIP call connection sequence in Operation Example 2 of the exemplary embodiment.

FIG. 5 illustrates another operation example of the exemplary embodiment when T.38 communication between the MFP 100 and the MFP 120 and T.38 communication between the MFP 100 and the MFP 130 are executed in parallel. This example is related to the case that the INVITE request from the MFP 130 is sent from the SIP server 102 to the MFP 100 with a delay.

Initially, T.38 communication is executed from the MFP 120 to the MFP 100. At that time, an INVITE request 400 is sent from the MFP 120 to the SIP server 122 in accordance with the SIP protocol. Upon receiving the INVITE request 400, the SIP server 122 replies, as a response, a "Trying" signal 403 to the MFP 120 and sends an INVITE request 401 to the SIP server 102. Upon receiving the INVITE request 401, the SIP server 102 replies, as a response, a "Trying" signal 404 to the SIP server 122 and sends an INVITE request 402 to the MFP 100.

Upon receiving the INVITE request 402, the MFP 100 shifts the apparatus status to a ringing state and starts a ringing tone. Further, the MFP 100 replies, as a response to the INVITE request 402, a "Ringing" signal 405 to the SIP server 102.

When T.38 communication is executed from the MFP 130 to the MFP 100 in a state during the execution of the above call control communication, an INVITE request 430 is sent from the MFP 130 to the SIP server 132 in accordance with the SIP protocol. Upon receiving the INVITE request 430, the SIP server 132 replies, as a response, a "Trying" signal 433 to the MFP 130 and sends an INVITE request 431 to the SIP server 102. Upon receiving the INVITE request 431, the SIP server 102 replies, as a response, a "Trying" signal 434 to the SIP server 132 and sends an INVITE request 432 to the MFP 100.

In this example, unlike Operation Example 1 described above, it is assumed that the SIP server 102 takes a longer time to send the INVITE request 432 to the MFP 100 for the reason that the processing (such as sending the "Ringing" signal 405) required in the SIP session between the MFP 120 and the MFP 100 is under execution.

On the other hand, upon receiving the "Ringing" signal 405 from the MFP 100 in response to the INVITE request 402, the SIP server 102 replies, to the SIP server 122, a "Ringing" signal 406 indicating that the MFP 100 has come into a ringing state. Upon receiving the "Ringing" signal 406, the SIP server 122 replies a "Ringing" signal 407 to the MFP 120, thus notifying the MFP 120 of the situation that the MFP 100 is now in the ringing state.

When the MFP 100 comes into a state capable of receiving image data from the MFP 120, the MFP 100 replies an OK signal 408 to the SIP server 102. Upon receiving the OK signal 408, the SIP server 102 replies an OK signal 409 to the SIP server 122. Then, when the SIP server 122 replies an OK signal 410 to the MFP 120, the MFP 120 can confirm that the MFP 100 has come into the data receivable state.

By confirming that the MFP 100 has come into the data receivable state, the MFP 120 directly sends an ACK signal 411 to the MFP 100, thus notifying that data is going to be sent from now.

During a period in which the above-described processing is executed, the INVITE request 432 from the MFP 130 is sent to the MFP 100 through the SIP server 102. In other words, the MFP 100 is in a state having received a plurality of call connection requests.

If a "Ringing" signal in response to the INVITE request 432 is replied at that timing, this results in a situation that the MFP 100 executes the SIP sessions with respect to a plurality of partners in parallel. Therefore, the MFP 100 does not immediately reply the "Ringing" signal.

Meanwhile, the call connection request from the MFP 120 is ended with the ACK signal 411 and the processing is transited to a media session state. Thereafter, the MFP 100 receives the image data from the MFP 120 in Media Sessions 412-416.

After the end of the SIP session with respect to the MFP 120, the MFP 100 replies, in response to the INVITE request 432 from the MFP 130, a "Ringing" signal 436 to the SIP server 102. Note that a time 435 from the INVITE request 432 to the "Ringing" signal 436 is not longer than 200 msec, i.e., not exceeding the value specified by RFC3261. Upon receiving the "Ringing" signal 436, the SIP server 102 replies a "Ringing" signal 437 to the SIP server 132, thus notifying that the MFP 100 has come into a ringing state. Such a notification is further sent to the MFP 130 by a "Ringing" signal 438.

When the MFP 100 comes into a state capable of receiving image data from the MFP 130, the MFP 100 replies an OK signal 439 to the SIP server 102. Upon receiving the OK signal 439, the SIP server 102 replies an OK signal 440 to the SIP server 132. Then, when the SIP server 132 replies an OK signal 441 to the MFP 130, the MFP 130 can confirm that the MFP 100 has come into the data receivable state.

By confirming that the MFP 100 has come into the data receivable state, the MFP 130 directly sends an ACK signal 442 to the MFP 100, thus notifying that data is going to be sent from now.

A media session from the MFP 130 is started to communicate the image data in Media Sessions 443-446. During a time from 443 to 416 in a period covering those Media Sessions 443-446, the MFP 100 receives the image data in the media sessions with respect to the MFP 120 and the image data in the media sessions with respect to the MFP 130 in parallel.

When the media sessions from the MFP 120 are ended, the MFP 120 sends a BYE signal 417 to the MFP 100. Then, the MFP 100 replies an OK signal 418 to the MFP 120, whereby a series of communication steps between the MFP 120 and the MFP 100 are completed. Further, when the media sessions from the MFP 130 are ended, the MFP 130 sends a BYE signal 447 to the MFP 100. Then, the MFP 100 replies an OK signal 448 to the MFP 130, whereby a series of communication steps between the MFP 130 and the MFP 100 are completed.

(Exemplary Processing Procedures for Implementing Operation Examples 1 and 2)

Figure 6A:
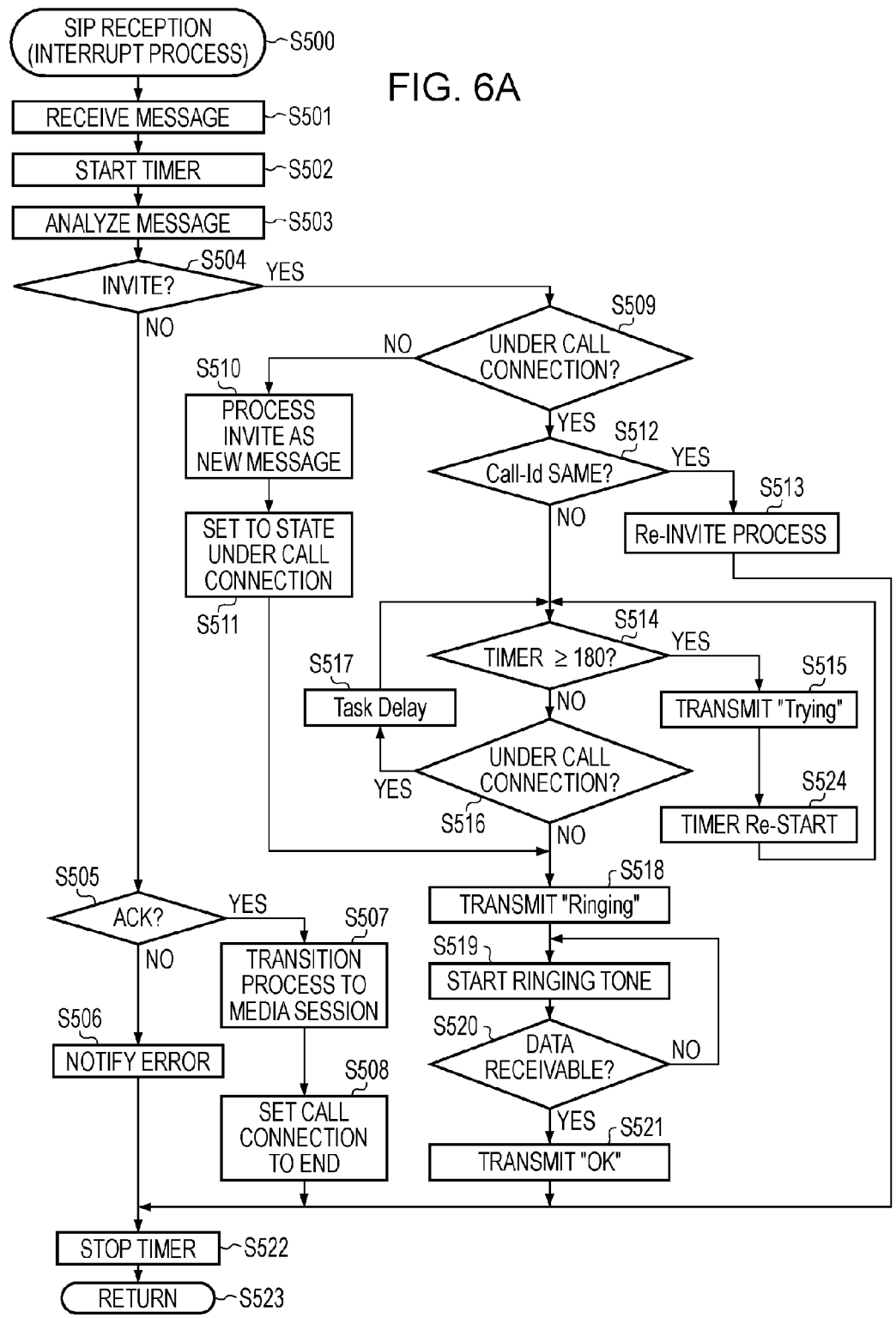
FIG. 6A is a flowchart showing an exemplary operation sequence of the MFP in the SIP call connection sequences of Operation Examples 1 and 2.

FIG. 6A is a flowchart showing exemplary operation procedures of the MFP 100 for implementing Operation Examples 1 and 2. The operation shown in the flowchart of FIG. 6A is started as an interrupt process when a SIP message is received. Also, messages sent from plural transmitters are discriminated from each other by using respective Call-Ids and the processing shown in the flowchart is executed per Call-Id. In other words, the MFP 100 executes the flowchart in plural flows in parallel (see FIG. 6B).

When the MFP 100 starts a SIP call connection, a SIP reception process is started in S500.

S501 represents a message receiving step in which the MFP 100 receives a message, e.g., the INVITE request 302. After receiving the message, a timer is started to count a time from the reception of the message to the reply of a response (S502). S503 represents a step of analyzing the received message.

In S504, it is checked whether the received message is the INVITE request. If the received message is not the INVITE request, it is checked in S505 whether the received message is an ACK signal. If other message than the ACK signal is received, an error is notified in S506 and the timer counting the response time is stopped and cleared in S522. Then, the processing is brought to an end in S523.

(INVITE Request)

If the received message is the INVITE request, the processing is transited to S509 in which it is determined from the call connection progress flag whether the MFP 100 is already in a state under the call connection with another communication. If the MFP 100 is not in the state under the call connection (i.e., if the call connection progress flag is turned OFF), the INVITE request is processed as a new message and allocation of a necessary memory area, for example, is performed in S510. Then, in S511, the system status is shifted to the state under the call connection (i.e., the call connection progress flag is turned ON).

Thereafter, the MFP 100 sends a "Ringing" signal in S518 and starts a ringing tone in S519. It is determined in S520 whether the MFP 100 in a state capable of receiving image data in media sessions. If the MFP 100 is not in the data receivable state, the processing is returned to S519. On the other hand, if the MFP 100 is in the data receivable state, an OK signal is sent as a reply in S521 and the timer counting the response time is stopped in S522, whereby the processing is brought to an end.

If it is determined in S509 that the apparatus status is already in the state under the call connection (i.e., the call connection progress flag is turned ON), the Call-Id of the INVITE request newly received to be connected is compared in S512 with the Call-Id of a JOB that has already been connected. If the Call-Id of the newly received INVITE request is already present, this means that the INVITE request has been sent double with the same communication from the same apparatus. Therefore, a Re-INVITE process is executed in S513 for transition of the program flow to S522.

If the compared Call-Ids are not the same, it is checked in S514 whether a value of the timer started in S502 is 180 msec or more. If the timer value is not larger than 180 msec and a determination result in S516 indicates that the MFP 100 is in the state under the call connection, a Task_Delay process is executed in S517 such that the MFP 100 does not perform its own operation for a certain time while allowing a program in another task to be operated with priority. The processing is then returned to S514. If the timer value exceeds 180 msec, a "Trying" signal message is sent in S515 and the timer is reset to restart the counting in S524. The processing is then returned to S514. That "Trying" signal message corresponds to the "Trying" signal 336. Note that the value of 180 msec is set in consideration of a margin of 20 msec so as to meet the provision of RFC3261 specifying that a response should be replied within 200 msec. In other words, 180 msec corresponds to the time denoted by 335.

Through the above-described steps, the processing illustrated in FIGS. 4 and 5 is executed as follows. First, when the SIP connection is newly requested in the state that another JOB under the SIP connection is already present, the SIP connection process for a newly received JOB to be connected is not executed. Then, when the another JOB under the connection is transited to the media session within 180 msec, the SIP connection process for the newly received JOB to be connected is executed after the transition of the another JOB. On the other hand, when the time of 180 msec is exceeded before the transition of the another JOB, the "Trying" signal message is temporarily replied as a provisional response and the SIP connection process for the newly received JOB to be connected is executed after the transition of the another JOB under the connection to the media session.

Returning to FIG. 6A, when the another JOB under the connection is transited from the call connection progress state to the media session by the program operation which has been processed with priority, the processing is advanced to S518.

S518 represents a step of sending a "Ringing" signal message. After sending the message, a step of starting a ringing tone is executed in S519. After the end of S519, it is checked in S520 whether the apparatus is in a state capable of receiving data of media sessions. If the apparatus is not in the data receivable state, the processing is returned to S519, and if the apparatus is in the data receivable state, an OK signal message is sent in S521 and the processing is transited to S522.

(Ack Message)

If the received message is the ACK signal, a process for transition to the media session is executed in S507, and the call connection progress flag is reset (turned off) in S508. Thus, the call connection state is ended for transition to the media session state and the processing is advanced to S522.

(More Detailed Description with Reference to FIGS. 4, 5, 6A and 6B)

Figure 6B:
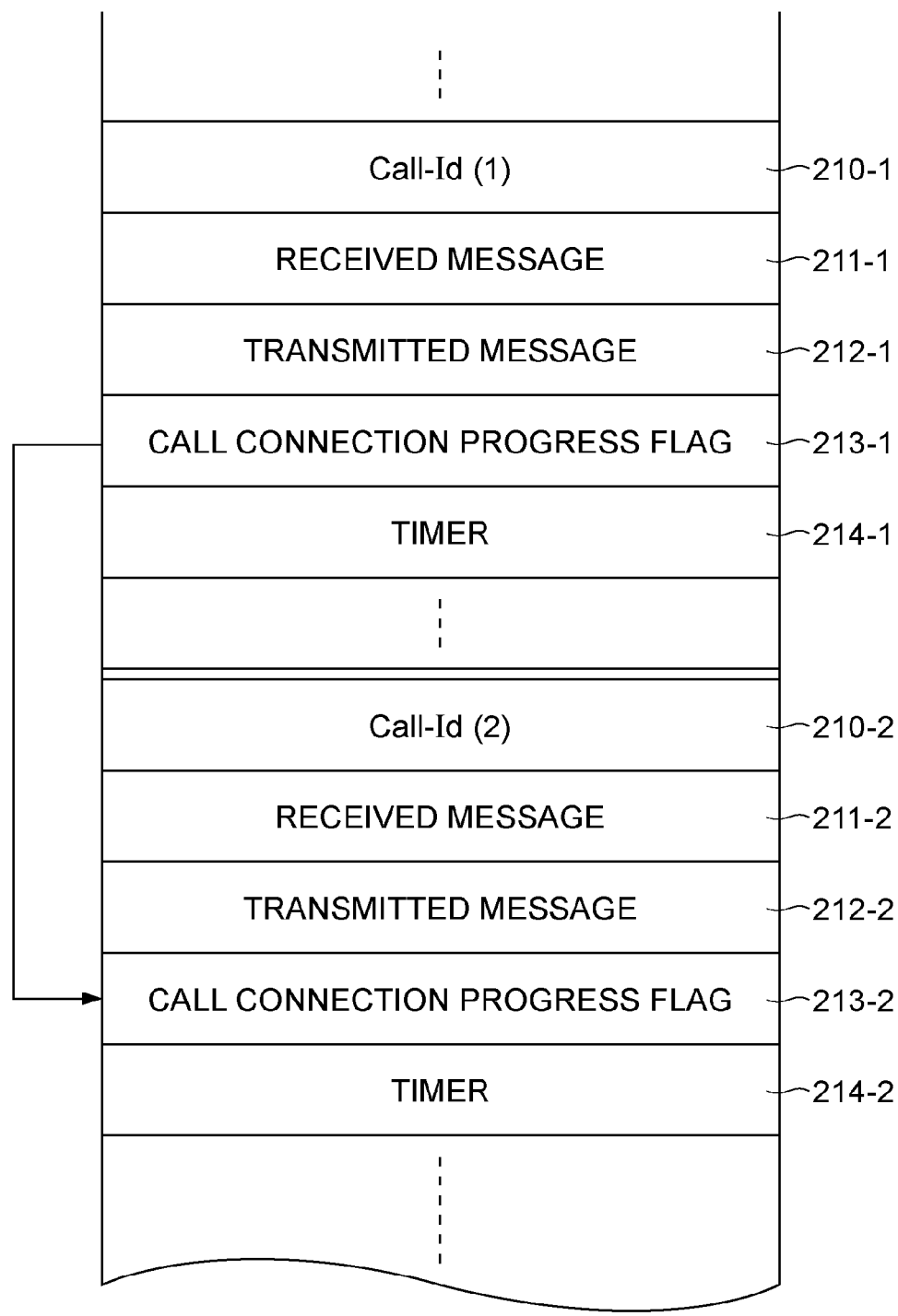
FIG. 6B illustrates an exemplary configuration of data stored in the RAM of the MFP in the operation sequence example of FIG. 6A.

FIG. 6B schematically illustrates situations of the RAM 162 when the processing of FIG. 4 or 5 is executed according to the flowchart of FIG. 6A. For easier understanding of the processing procedures of FIG. 6A, the following description is given in accordance with the processing of FIG. 4 or 5. Note that, in the following description, each step of the SIP reception process based on the message from the MFP 120 is denoted by SXXXA and each step of the SIP reception process based on the message from the MFP 130 is denoted by SXXXB.

When the INVITE request from the MFP 120 is sent to the MFP 100, storage areas 210-1 to 214-1 shown in FIG. 6B are allocated and the Id of the MFP 120 is loaded in 210-1 (Call-Id(1)). The processing in the flowchart of FIG. 6A is advanced in the order of S501A-S502A-S503A-S504A-S509A-S510A-S511A. In S511A, a call connection progress flag 213-1 is set. Further, the processing in the flowchart of FIG. 6A is advanced in the order of S518A-S519A in which the "Ringing" signal is replied and the ringing tone is started in the MFP 100. Then, the MFP 120 waits in S520A that the MFP 100 comes into the data receivable state.

(Example of FIG. 4)

Here, when the INVITE request is sent from the MFP 130 to the MFP 100 before the MFP 100 comes into the data receivable state, the processing of FIG. 4 is executed.

Upon receiving the INVITE request from the MFP 130, the flowchart of FIG. 6A is started. At this time, the processing of FIG. 6A in response to the INVITE request from the MFP 120 is executed in parallel while looping through S519A-S520A. Further, storage areas 210-2 to 214-2 shown in FIG. 6B are allocated and the Id of the MFP 130 is loaded in 210-2 (Call-Id(2)). Simultaneously, the call connection progress flag 213-1 is copied to a call connection progress flag 213-2, whereby the flag is turned ON.

The processing of the flowchart of FIG. 6A for the MFP 130 is advanced in the order of S501B-S502B-S503B-S504BA-S509B. Because the call connection progress flag is turned on, the processing is advanced to S512B. Further, because the Call-Ids of the MFP 120 and the MFP 130 differ from each other, the processing enters a loop of S514B-S516B-S517B and is not advanced to the "Ringing" process in response to the INVITE request from the MFP 130.

In the example of FIG. 4, when the MFP 100 comes into the data receivable state during the above-described looping process, the processing exits the loop of S519A-S520A and the OK signal is sent in S521A.

On the other hand, if the timer value reaches 180 msec during the looping process through S514B-S516B-S517B, the "Trying" signal 336 is sent in the process of S514B-S515B-S524B and the processing is returned again to the loop of S514B-S516B-S517B.

When the OK signal sent in S521A arrives at the MFP 120 and the MFP 120 directly sends the ACK signal to the MFP 100 during the above-described looping process, the SIP reception process is restarted. More specifically, the processing of the flowchart of FIG. 6A is advanced in the order of S501A-S502A-S503A-S504A-S505A-S507A-S508A. Further, the processing is transited from the call connection process to the media session and the call connection progress flag is turned OFF in S508A.

Upon confirming in S516B that the call connection progress flag is turned OFF, the processing flow in response to the INVITE request from the MFP 130 is advanced to S518B and the subsequent steps. Thereafter, through the steps of sending the "Ringing" signal, sending the OK signal, and receiving the ACK signal, the processing is transited from the call connection process to the media session.

(Example of FIG. 5)

Here, when the processing of the SIP server 102 is delayed and the INVITE request from the MFP 130 is not sent to the MFP 100 before the MFP 100 comes into the data receivable state in S520A, the processing of FIG. 5 is executed.

Before the INVITE request from the MFP 130 is sent to the MFP 100, the processing is advanced from S520A to S521A in which the OK signal is sent. Thereafter, the INVITE request from the MFP 130 is sent to the MFP 100 and the processing of the flowchart of FIG. 6A, denoted by SXXXB, is executed almost similarly to the example of FIG. 4.

The example of FIG. 5 differs from the example of FIG. 4 in that, before the timer value reaches 180 msec with the determination in S514B, the OK signal sent in S521A arrives at the MFP 120 and the MFP 120 sends the ACK signal. Thus, the processing is transited from the call connection process to the media session and the call connection progress flag is turned OFF in S508A.

Accordingly, the processing for the MFP 130 is advanced from S516B to S518B without sending the "Trying" signal in S515B, and the "Ringing" process in response to the INVITE request from the MFP 130 is started.

OPERATION EXAMPLE 3

FIG. 7 illustrates Operation Example 3 of the exemplary embodiment when T.38 communication between the MFP 100 and the MFP 120 and T.38 communication between the MFP 100 and the MFP 130 are executed substantially at the same time.

Initially, T.38 communication is executed from the MFP 120 to the MFP 100 and an INVITE request 600 is sent from the MFP 120 to the SIP server 122 in accordance with the SIP protocol. Upon receiving the INVITE request 600, the SIP server 122 replies, as a response, a "Trying" signal 603 to the MFP 120 and sends an INVITE request 601 to the SIP server 102. Upon receiving the INVITE request 601, the SIP server 102 replies, as a response, a "Trying" signal 604 to the SIP server 122 and sends an INVITE request 602 to the MFP 100.

Upon receiving the INVITE request 602, the MFP 100 shifts the apparatus status to a ringing state and starts a ringing tone. Further, the MFP 100 replies, as a response to the INVITE request 602, a "Ringing" signal 605 to the SIP server 102.

When T.38 communication is executed from the MFP 130 to the MFP 100 in a state during the execution of the above call control communication, an INVITE request 630 is sent from the MFP 130 to the SIP server 132 in accordance with the SIP protocol. Upon receiving the INVITE request 630, the SIP server 132 replies, as a response, a "Trying" signal 633 to the MFP 130 and sends an INVITE request 631 to the SIP server 102. Upon receiving the INVITE request 631, the SIP server 102 replies, as a response, a "Trying" signal 634 to the SIP server 132 and sends an INVITE request 632 to the MFP 100.

In this example, however, because the MFP 100 has received the INVITE request from the MFP 120 and is already in the state under the call connection, the MFP 100 cannot process messages from the MFP 130 which has requested the connection at later timing. Therefore, the MFP 100 executes communication control so as to reply a BUSY signal 635 for notifying that the MFP 100 is in a busy state. Hereinafter, a busy message is also called a BUSY signal. The BUSY signal 635 is transferred to the MFP 130 via the SIP servers 102 and 132 which send BUSY signals 636 and 637 respectively. Upon receiving the busy message, the MFP 130 can confirm that the MFP 100 is in the BUSY state and cannot process a new message.

During the above process, the "Ringing" signal 605 is transferred to the MFP 120 via the SIP servers 102 and 122 which send "Ringing" signals 606 and 607 respectively.

When the MFP 100 comes into a state capable of receiving image data in media sessions, the MFP 100 sends an OK signal 608. The OK signal 608 is transferred to the MFP 120 via the SIP servers 102 and 122 which send OK signals 609 and 610 respectively.

Upon receiving the OK signal 610, the MFP 120 directly sends an ACK signal 611 to the MFP 100, thus notifying that the image data is going to be sent from now. Numerals 612-616 represent Media Sessions in which the image data is sent from the MFP 120 to the MFP 100.

When the transmission of the image data to be sent from the MFP 120 is ended, the MFP 120 sends a BYE signal 617 to the MFP 100. Then, the MFP 100 replies an OK signal 618 to the MFP 120, whereby a series of communication steps from the MFP 120 to the MFP 100 are completed.

On the other hand, the MFP 130 having received the BUSY signal 637 resends the JOB. The INVITE request resent from the MFP 130 is denoted by 638. Upon receiving the INVITE request 638, the SIP server 132 replies, as a response, a "Trying" signal 641 to the MFP 130 and sends an INVITE request 639 to the SIP server 102. Upon receiving the INVITE request 639, the SIP server 102 replies, as a response, a "Trying" signal 642 to the SIP server 132 and sends an INVITE request 640 to MFP 100.

Because the call connection state from the MFP 120 is now transited from the state under the call connection to the media session, the MFP 100 having received the INVITE request 640 sends a "Ringing" signal 643 instead of the BUSY signal, thus processing the call connection from the MFP 130. The "Ringing" signal 643 is transferred to the MFP 130 via the SIP servers 102 and 132 which send "Ringing" signals 644 and 645 respectively.

When the MFP 100 comes into a state capable of receiving image data in media sessions from the MFP 130, the MFP 100 sends an OK signal 646. The OK signal 646 is transferred to the MFP 130 via the SIP servers 102 and 132 which send OK signals 647 and 648 respectively. Upon receiving the OK signal 648, the MFP 130 directly sends an ACK signal 649 to the MFP 100, thus notifying that the image data is going to be sent from now. Numerals 650-653 represent Media Sessions in which the image data is sent from the MFP 130 to the MFP 100.

Thus, in time zone from 650 to 616, the MFP 100 processes both the image data from the MFP 120 and the image data from the MFP 130 in parallel. When the transmission of the image data to be sent from the MFP 130 is ended, the MFP 130 sends a BYE signal 654 to the MFP 100. Then, the MFP 100 replies an OK signal 655 to the MFP 130, whereby a series of communication steps from the MFP 130 to the MFP 100 are completed.

(Exemplary Processing Procedures for Implementing Operation Example 3)

Figure 8:
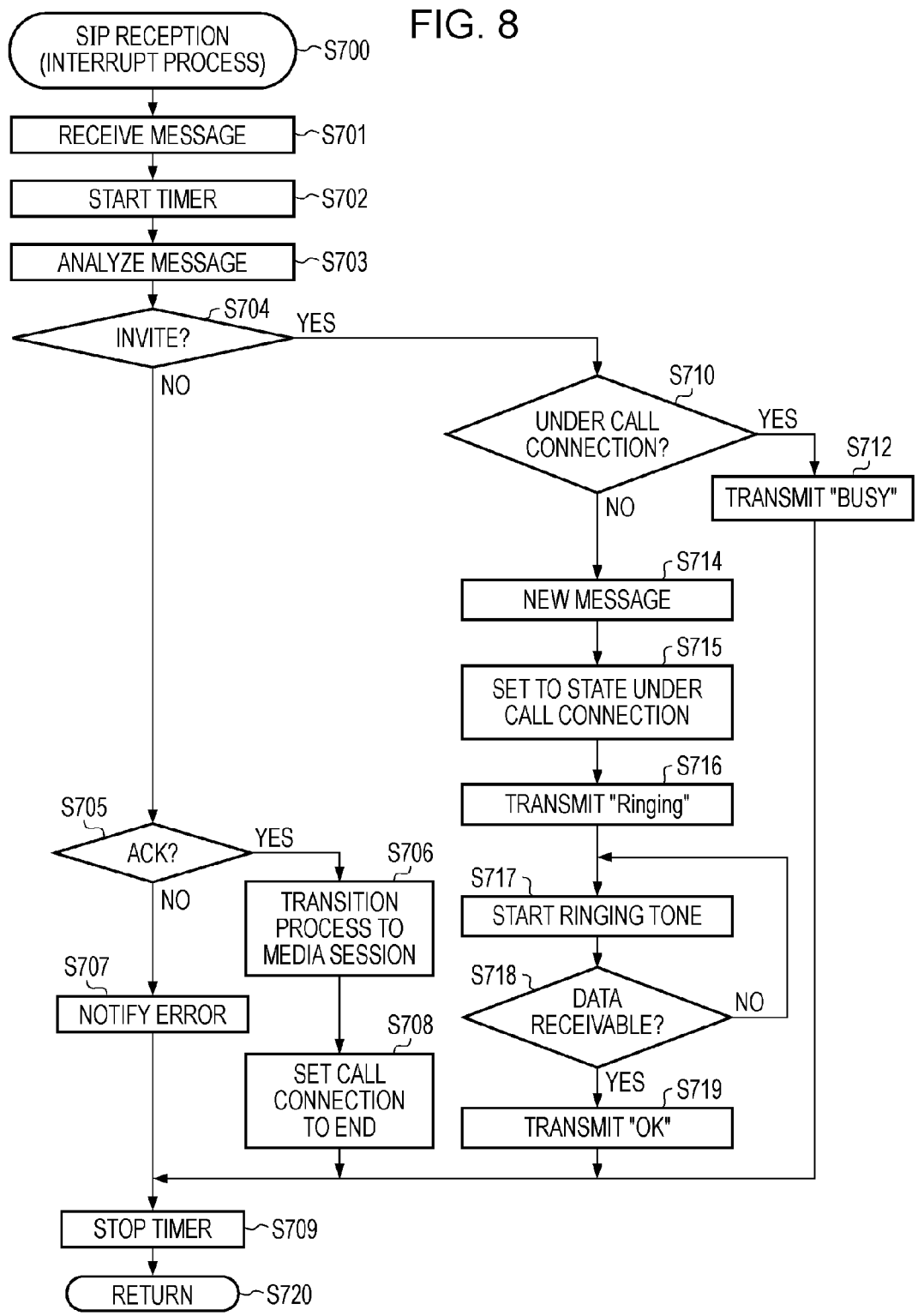
FIG. 8 is a flowchart showing an exemplary operation sequence of the MFP in the SIP call connection sequences of Operation Example 3.
Figures 9, 10:
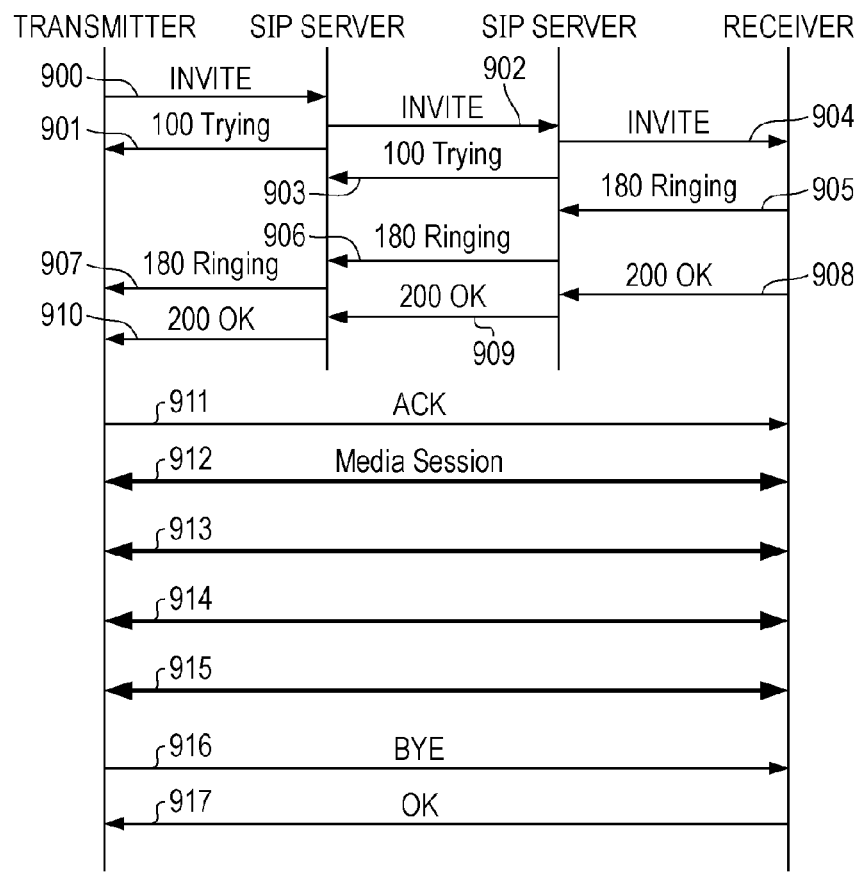
FIG. 9 illustrates one example of a SIP protocol in the related art.
FIG. 10 illustrates one example of SIP message data in the related art.

FIG. 8 is a flowchart showing exemplary operation procedures of the MFP 100 for implementing Operation Example 3. The operation shown in the flowchart of FIG. 8 is started as an interrupt process when a SIP message is received. Also, Operation Example 3 can be implemented by executing the processing of the flowchart of FIG. 8 in plural flows in parallel per Call-Id, or by simply executing an interrupt process in a Call-Return way.

When the MFP 100 starts a SIP call connection, a SIP reception process is started in S700.

S701 represents a message receiving step in which the MFP 100 receives a message, e.g., the INVITE request 602. After receiving the message, a timer is started to count a time from the reception of the message to the reply of a response (S702). S703 represents a step of analyzing the received message.

In S704, it is checked whether the received message is the INVITE request. If the received message is not the INVITE request, it is checked in S705 whether the received message is an ACK signal. If other message than the ACK signal is received, an error is notified in S707 and the timer counting the response time is stopped and cleared in S709. Then, the processing is brought to an end (S720).

(INVITE Request)

If the received message is the INVITE request, the processing is transited to S710 in which it is determined whether the MFP 100 is already in a state under the call connection with another communication. If the MFP 100 is in the state under the call connection (i.e., if the call connection progress flag is turned ON), a BUSY signal is sent in S712 and the processing is transited to S709. That BUSY signal corresponds to the BUSY signal 635.

If the MFP 100 is not in the state under the call connection, the received message is processed as a new message in S714 and allocation of a necessary memory area, for example, is performed in S714. Then, in S715, the system status is shifted to the state under the call connection (i.e., the call connection progress flag is turned ON).

Thereafter, the MFP 100 sends a "Ringing" signal in S716 and starts a ringing tone in S717. It is determined in S718 whether the MFP 100 in a state capable of receiving image data in media sessions. If the MFP 100 is not in the data receivable state, the processing is returned to S717.

On the other hand, if the MFP 100 is in the data receivable state, an OK signal is sent in S719 and the processing is transited to S709.

(ACK Message)

If the received message is the ACK signal, a process for transition to the media session is executed in S706, and the call connection state is brought to an end (i.e., the call connection progress flag is turned OFF) in S708 for transition to the media session state. The processing is then advanced to S709.

While the exemplary embodiment has been described above in connection with the case of using the call control protocol and SIP, embodiments of the present invention are featured in the processing executed by the MFP 100 when it operates as a receiver, and similar advantages can also be obtained even in the case of using another kind of call control, e.g., H.323 of the ITU-T recommendations.

Embodiments of the present invention can be applied to not only a system or an integrated apparatus including plural units of equipment (such as a host computer, an interface unit, and a printer), but also an apparatus constituted by a single unit of equipment.

The features of embodiments of the present invention can also be achieved by supplying a storage medium (or a recording medium), which stores or records program code of software for implementing the functions of the above-described exemplary embodiment, to a system or an apparatus. A computer (CPU or MPU) incorporated in the system or the apparatus reads and executes the program code stored in the storage medium.

In that case, the program code read out from the storage medium serves in itself to implement the functions of the above-described exemplary embodiment. Therefore, the storage medium storing the program code also constitutes an embodiment of the present invention.

Further, the present invention is not limited to the case where the functions of the above-described exemplary embodiment are implemented by the computer executing the read-out program code. Embodiments of the present invention also involves the case where, for example, an OS (operating system) operating on the computer executes a part or the whole of the actual processing in accordance with instruction of the program code, to thereby implement the functions of the above-described exemplary embodiment.

In addition, the program code read out from the storage medium can be written in a memory which is provided in a function extension card inserted in the computer or in a function extension unit connected to the computer. Then, a part or the whole of the actual processing can be executed by a CPU or the like, which is incorporated in the function extension card or the function extension unit, in accordance with instruction of the program code. Embodiments of the present invention involves the case where the functions of the above-described exemplary embodiment are implemented through the processing executed by such a CPU or the like.

When embodiments of the present invention are applied to the above-described storage medium, program code corresponding to the flowcharts described in the exemplary embodiment is stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-036806 filed Feb. 16, 2007, which is hereby incorporated by reference herein in its entirety.

What is claimed is:

1. A data communication apparatus configured to perform data communication by using a call control protocol, the apparatus including:
 a message receiving unit configured to receive a call connection request message from an external apparatus;
 a message transmitting unit configured to transmit a response message in reply to the call connection request message;
 a determining unit configured to determine whether a call connection process for communication with another external apparatus differing from the external apparatus is under execution, when the message receiving unit receives the call connection request message; and
 a control unit configured to control transmission of the response message from the message transmitting unit based on a determination result of the determining unit,
 wherein when the determining unit determines that the call connection process for communication with the another external apparatus is not under execution, the control unit controls the message transmitting unit to transmit the response message, and
 wherein when the determining unit determines that the call connection process for communication with the another external apparatus is under execution, the control unit executes control not to transmit the response message until the call connection process for communication with the another external apparatus is ended, and controls the message transmitting unit to transmit the response message after the call connection process for communication with the another external apparatus is ended, and, a call connection process for communication with the external apparatus is executed in parallel with an image data communication with the another external apparatus.

2. The data communication apparatus according to claim 1, further comprising a ringing unit configured to execute a ringing process in response to reception of the call connection request message by the message receiving unit,
 wherein when the determining unit determines that the call connection process for communication with the another external apparatus is not under execution, the control unit controls the ringing unit to execute the ringing process.

3. The data communication apparatus according to claim 1, wherein when the determining unit determines that the call connection process for communication with the another external apparatus is under execution and the call connection process with the another external apparatus is not ended even after lapse of a predetermined time from reception of the call connection request message by the message receiving unit, the control unit controls the message transmitting unit to transmit a provisional response message.

4. The data communication apparatus according to claim 1, wherein when the determining unit determines that the call connection process for communication with the another external apparatus is under execution, the control unit executes control to transmit the response message in response to the end of the call connection process for communication with the another external apparatus.

5. A data communication method configured to perform data communication by using a call control protocol, the method including:
 receiving a call connection request message from an external apparatus;
 transmitting a response message in reply to the call connection request message;
 determining whether a call connection process for communication with another external apparatus differing from the external apparatus is under execution, when the call connection request message is received; and
 controlling transmission of the response message based on a result of the determination,
 wherein when it is determined that the call connection process for communication with the another external apparatus is not under execution, the response message is transmitted, and
 wherein when it is determined that the call connection process for communication with the another external apparatus is under execution, the response message is not transmitted until the call connection process for communication with the another external apparatus is ended, and the response message is transmitted after the call connection process for communication with the another external apparatus is ended, and, a call connection process for communication with the external apparatus is executed in parallel with an image data communication with the another external apparatus.

6. The data communication method according to claim 5, wherein when it is determined that the call connection process for communication with the another external apparatus is not under execution, a ringing process is performed.

7. The data communication method according to claim 5, wherein when it is determined that the call connection process for communication with the another external apparatus is under execution and the call connection process with the another external apparatus is not ended even after lapse of a predetermined time from reception of the call connection request message, a provisional response message is transmitted.

8. The data communication method according to claim 5, wherein when it is determined that the call connection process for communication with the another external apparatus is under execution, the response message is transmitted in response to the end of the call connection process for communication with the another external apparatus.

9. A computer-readable storage medium which stores a program for causing a computer to perform a data communication method, the method including:
   receiving a call connection request message from an external apparatus;
   transmitting a response message in reply to the call connection request message;
   determining whether a call connection process for communication with another external apparatus differing from the external apparatus is under execution, when the call connection request message is received; and
   controlling transmission of the response message based on a result of the determination,
   wherein when it is determined that the call connection process for communication with the another external apparatus is not under execution, the response message is transmitted, and
   wherein when it is determined that the call connection process for communication with the another external apparatus is under execution, the response message is not transmitted until the call connection process for communication with the another external apparatus is ended, and the response message is transmitted after the call connection process for communication with the another external apparatus is ended, and, a call connection process for communication with the external apparatus is executed in parallel with an image data communication with the another external apparatus.

* * * * *